US006883856B2

(12) United States Patent
Burkat et al.

(10) Patent No.: US 6,883,856 B2
(45) Date of Patent: Apr. 26, 2005

(54) VEHICLE DOOR STOP SYSTEM

(75) Inventors: Frederic Burkat, Bouzy la Foret (FR); Jean Marc Belmond, St Jean le Blanc (FR); Michel Mounie, St Florent le Jeune (FR)

(73) Assignee: ArvinMeritor Light Vehicle Systems - France (FR)

( * ) Notice: Subject to any disclaimer, the term of this patent is extended or adjusted under 35 U.S.C. 154(b) by 62 days.

(21) Appl. No.: 10/649,333

(22) Filed: Aug. 26, 2003

(65) Prior Publication Data

US 2004/0070230 A1 Apr. 15, 2004

(30) Foreign Application Priority Data

Aug. 26, 2002 (FR) .......................................... 02 10562

(51) Int. Cl.⁷ .................................................. B60J 5/04

(52) U.S. Cl. ............................... 296/146.1; 296/146.9; 296/207

(58) Field of Search .......................... 296/146.1, 146.5, 296/146.9, 207

(56) References Cited

U.S. PATENT DOCUMENTS

| | | | | |
|---|---|---|---|---|
| 3,819,228 A | * | 6/1974 | Cornacchia | 296/146.9 |
| 5,369,911 A | | 12/1994 | Fortunato | |
| 6,744,365 B2 | * | 6/2004 | Sicuranza | 296/146.1 |
| 6,749,253 B1 | * | 6/2004 | Zummallen et al. | 296/146.9 |
| 2002/0063440 A1 | * | 5/2002 | Spurr et al. | 296/146.9 |

FOREIGN PATENT DOCUMENTS

| | | |
|---|---|---|
| JP | 4121222 A | 4/1992 |
| JP | 5270266 A | 10/1993 |

OTHER PUBLICATIONS

French search report, dated Apr. 17, 2003.

* cited by examiner

*Primary Examiner*—Jason Morrow
(74) *Attorney, Agent, or Firm*—Carlson, Gaskey & Olds

(57) ABSTRACT

A vehicle door has a stop that can move between an urging position, in which it maintains a constant distance between a lower part of the door and the vehicle body when the door is closed, and a retracted position in which the stop does not maintain this constant distance between the lower part of the door and the vehicle body when the door is closed. The stop improves contact between the vehicle window surround and the vehicle body while the vehicle is moving, and can be retracted to make it easier to close the door.

20 Claims, 1 Drawing Sheet

AA

VEHICLE DOOR STOP SYSTEM

REFERENCE TO RELATED APPLICATIONS

The present invention claims the benefit of French Patent Application No. 02 10 562, filed Aug. 26, 2002.

TECHNICAL FIELD

The present invention relates to a vehicle door stop, to a vehicle door with such a stop and to a vehicle with such a door.

BACKGROUND OF THE INVENTION

In motor vehicle structures, the side doors of vehicles often deform as the vehicle travels, particularly at higher speeds. For example, in the case of doors that pivot about a hinge pin, the upper rear corner of the window surround tends to move away from the vehicle body while the rear lower corner of the door moves closer to the vehicle body. The faster the vehicle travels, the greater the pressure difference between the interior and the exterior of the vehicle and the more the door deforms. Likewise, larger doors having lower torsional stiffness tend to deform more.

This propensity to deform is also particularly detrimental to the resistance against break-in because it is possible to force the surround away from the door.

The outward displacement of the upper rear corner of the door is particularly detrimental to the sealing of the cabin against air ingress. For example, per 10 millimeters of displacement of the upper rear corner of the front door window surround under a separating force of 20 decanewtons, 7 to 8 millimeters are of a geometric nature and originate from a rotation of the bottom part of the door about an axis running between the lock and the upper door hinge. The rest of the deformation originates from pure bending of the window surround.

To solve this problem, U.S. Pat. No. 6,283,534 discloses a vehicle door with a moving surround. The door comprises a first structure connected such that it can move to the vehicle body of the vehicle and a second structure connected to the first structure such that it can pivot about a roughly horizontal axis. The second structure comprises the window surround. The door also comprises a mechanism to cause the second structure to pivot with respect to the first structure. Thus, when the door is closed, the second structure is pivoted in such a way that the window surround exerts a force on the door seal situated between the vehicle body and the door. The disadvantage of such a solution is that the door has a complex structure and expensive to manufacture.

One possible solution also involves altering the cross section of the door seal between the door and the vehicle body. Overcompressing the seal makes it possible to compensate for some of the deformation and to reduce the noise generated by the wind when the vehicle is traveling at high speed. The disadvantage is that the user has to exert more energy to close the door and has to apply more force to undo the lock in order to open the door.

Another proposed solution includes a fixed rubber stop at the bottom of the door, the door being able to pivot about hinges. When the door is closed, the stop comes into contact with the chassis of the vehicle and opposes the rotation of the bottom part of the door at high speed so as to force the window surround against the vehicle body. The disadvantage here again is that the user has to slam the door harder to close it in order to overcome the forces due to the presence of the stop. Furthermore, the lock is overengineered in order to overcome the additional forces due to the seals and/or to the rubber stop, these elements having a tendency to push the door outwards.

There is therefore a need for a vehicle that solves the problems generated by the deformation of the doors while at the same time making sure that the door is easy to open and close.

SUMMARY OF THE INVENTION

The invention is generally directed to a vehicle door stop that can move between an urging position, in which the stop maintains a constant distance between a lower part of the door and the vehicle body of the vehicle when the door is closed, and a retracted position, in which the stop does not maintain a constant distance between the lower part of the door and the vehicle body when the door is closed.

According to one embodiment, the stop can be moved on the basis of a signal from a vehicle speed or displacement sensor.

According to one embodiment, the door may have an interior face facing towards the interior of the vehicle, the stop being able to move transversely to the interior face.

Advantageously, the vehicle incorporating the invention may comprise a member for driving the stop.

According to one embodiment, the door may have an interior face and an exterior face defining a caisson between them, the stop being able to move between a position retracted into the caisson and a position projecting from the interior face.

According to another embodiment, the stop may be in the vehicle body.

The invention is also directed to a vehicle door having an interior face and a stop able to move in a lower part of the door.

Advantageously, the door incorporating the invention may comprise an exterior face defining a caisson with the interior face, and a member inside the caisson for driving the stop transversely to the interior face. In one embodiment, the stop may be able to move between a position retracted into the caisson and an urging position projecting from the interior face.

According to one embodiment, the stop may be able to move through an opening in the door, the opening being plugged by a moving bellows.

The invention also relates to a moving vehicle-door stop actuated by a vehicle speed or displacement sensor.

Other characteristics and advantages of the invention will become apparent from reading the detailed description which follows of some embodiments of the invention given purely by way of example and with reference to the drawings.

DETAILED DESCRIPTION OF PREFERRED EMBODIMENTS

The invention generally relates to a movable door stop for a motor vehicle. The stop can move between an urging position, in which the stop maintains a constant distance between a lower part of the door and the vehicle body when the door is closed, and a retracted position in which the stop does not maintain a constant distance between the lower part of the door and the vehicle body when the door is closed.

The invention has the advantage of protecting the vehicle against break-in because it allows better contact between the upper part of the door and the vehicle body. Furthermore, when the door is in the closed position when the vehicle is traveling, the distance between the vehicle body and the lower part of the door is kept constant by the stop. Thus, the stop is able to block rotational movement of the door and prevent the lower part of the door from moving closer to the vehicle body, which it is liable to do because of the pressure differences across the door, thus limiting the distance between the upper part of the door and the vehicle body. However, because the stop is movable, it can be retracted to make the door easier to open and close.

Figure 1:
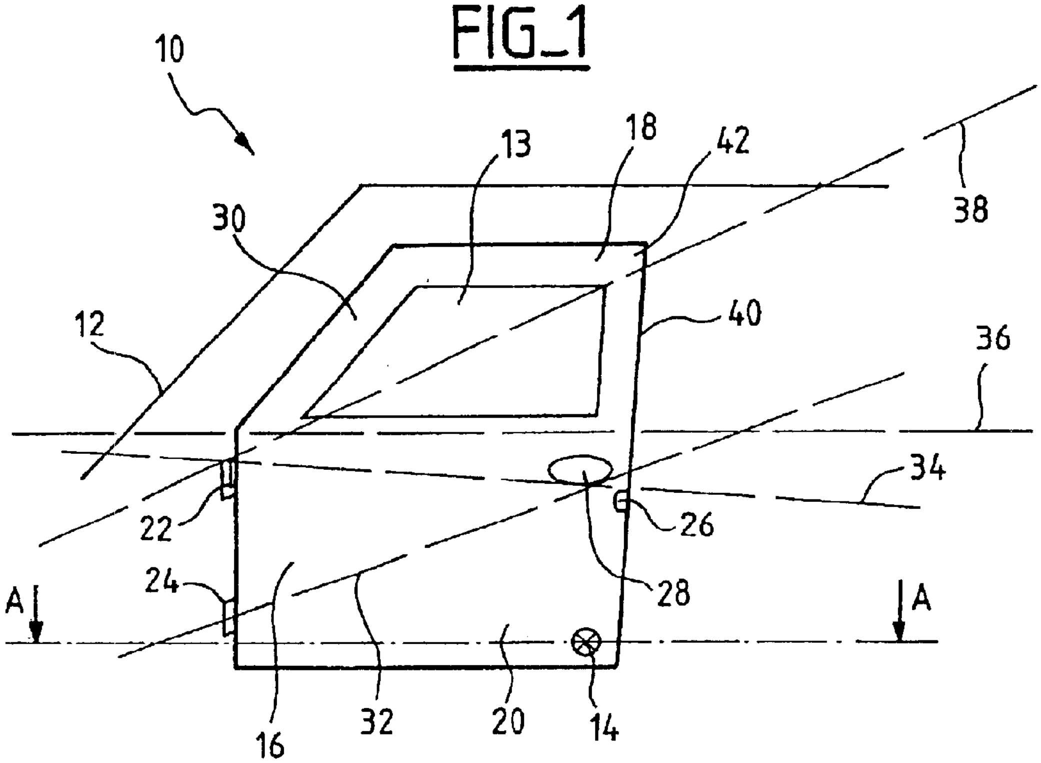
FIG. 1 is a view of part of a vehicle according to the invention.

FIG. 1 shows a view of a vehicle 10 according to one embodiment of the invention. The vehicle 10 comprises vehicle body 12, a moving stop 14 and a door 16. The door 16 has an upper part 18 and a lower part 20. When the door is in the closed position, the stop 14 can occupy an urging position in which the stop maintains a constant distance between a lower part of the door and the vehicle body when the door is closed. A constant distance is maintained because the stop 14 is inserted between the lower part 20 and the vehicle body 12, preventing the lower part 20 from moving closer toward the vehicle body 12. When the door is in the closed position, the stop 14 can also occupy a retracted position in which the stop does not maintain a constant distance between the lower part of the door and the vehicle body when the door is closed. In this case, the stop is no longer disposed between the lower part 20 and the vehicle body 12. Movement of the stop 14 between the urging and retracted positions can be conducted via any actuation mechanism, several of which will be described in greater detail below.

In the closed position, the door 16 is held against the vehicle body via its roughly vertical lateral edges. As shown in FIG. 1, the door can pivot about upper and lower hinges 22, 24 with respect to the vehicle body 12. The door 16 can also, for example, be of the sliding type held via its lateral edges to the vehicle body in a closed position. In FIG. 1, the door 16 has a lock 26 operated by a handle 28. The door 16 has a window 13 surrounded by a window surround 30.

When the door 16 is closed and the stop 14 is retracted, the door can experience deformation about a number of axes 32, 34, 36, 38. The door may experience twisting about the axis 32 running between the lower hinge 24 and the lock 26 and about the axis 34 running between the upper hinge 22 and the lock 26. The door may also experience twisting about the axis 36 running roughly horizontally along the bottom of the window surround 30 and about the axis 38 running across the window 13 from the upper hinge 22. For example, along the axis 40, the deformation of the door 16 is zero at the lock 26; the deformation increases inwards towards the bottom and outwards towards the top of the door along the axis 40. The displacement is at its greatest at the point 42 situated in the upper corner of the window surround 30 furthest from the hinge 22. The displacement at the point 42 is the greatest because it is the result both of the twisting of the lower part 20 combined with the pure bending of the surround 30.

The upper part 18 is the part of the door most subject to deformation away from the vehicle body. The upper part 18 is mainly the part of the door situated above a roughly horizontal axis passing through the door lock. The upper part 18 comprises the surround 30 of the window 13 and particularly the upper edge of the surround 30. The surround 30 of the window 13 is the least rigid part of the door, and the deformation displacement increases as the point concerned moves further away from the lock 26 and, in particular, from the axis 34.

The lower part 20 comprises the lower edge of the door situated near the chassis of the vehicle. The lower part 20 is mainly the part of the door situated beneath the roughly horizontal axis passing through the door lock.

When the door is closed, the stop 14 allows the lower part of the door 20 to be blocked at four points on the vehicle body 12, in conjunction with the hinges 22, 24 and the lock 26. Because the lower part 20 is very rigid between the axis 34 and the axis 36, the displacement of the point 42 corresponding to the upper rear corner of the surround is restricted to pure bending of the surround 30 about the axis 36. The sealing of the door at high speed and the resistance to break-in by deformation of the rear of the door are therefore improved.

The stop 14 can be displaced in such a way that the lower part 20 of the door 16 can move closer to the vehicle body 12. The stop 14 can move between an urging position and a retracted position. The advantage is that, when the stop 14 is in the retracted position, the door is easier to open and close because the lock is no longer under stress.

In one embodiment, the stop 14 urges the lower part 20 of the door in such a way that the moment exerted on the door while it is being urged with respect to the lock is as large as possible. In particular, the stop may be at the chassis of the vehicle, along the lower edge of the door. Thus, the distance between the upper part 18 and the vehicle body varies very little as the vehicle travels along, thus improving the sealing of the vehicle.

By way of example, the distance between the lower part 20 and the vehicle body may be between 5 and 15 mm.

Advantageously, the stop 14 can move transversely to an interior face 44 (FIG. 2) of the door 16, thus making it possible to maintain the distance between the upper part 18 of the door and the vehicle body more effectively. The interior face 44 of the door 16 faces toward the interior of the vehicle 10.

The stop 14 is moved by a drive member which will be described in conjunction with FIG. 2 below.

According to one embodiment, the stop 14 can be retractable on the basis of a signal from a vehicle speed sensor. The sensor detects the speed of the vehicle and triggers a signal activating the stop from, for example, a threshold value of 5 km/h. (3 miles per hour). Thus, below this threshold value, the stop 14 is retracted and allows the user to open and close the door unhindered. Above this threshold value, the door 16 is theoretically no longer operated, the stop 14 being in the urging position and the upper part 18 held against the vehicle body 12.

Alternatively, the moving stop 14 may be moved by the action of the handle 28. A sensor may, for example, detect manipulation of the door handle and cause the stop 14 to retract. Thus, opening and closing the door are easier. Once the door is closed again, the stop 14 can be moved into the urging position once the speed threshold is reached again.

According to another embodiment, the stop may be moved on the basis of a signal for protecting the vehicle against theft. For example, the stop may be moved when the on-board computer detects a security-locking command.

The stop 14 then allows the upper part 18 of the door to be held even more securely against the vehicle body, thus preventing a thief inserting a tool between the upper edge of the door and the vehicle body.

The stop 14 may be in the vehicle body 12 or in the door 16. When the stop 14 is in the door 16, the stop comes into contact with the vehicle body 12 in the urging position. The stop 14 preferably comes into contact with the vehicle chassis in such a way that the moment of the reaction force is as high as possible with respect to the lock. In the retraction position, the stop 14 is embedded in the door. The advantage is that there is space available in the caisson to house the stop. Furthermore, if the door has a door controller managing the on-board electronics in the door, communication and management performed by the controller is simpler when the stop is in the door.

Also, the presence of the stop in the door allows the wiring between the stop and its control device to be limited. When the stop 14 is in the vehicle body 12, the stop 14 comes into contact with the interior face 44 of the door 16. In the retracted position, the stop 14 is embedded in the vehicle body. The advantage is that there is more space for the stop 14 and its drive member in the vehicle body 12. The stop 14 is preferably in the chassis to urge the door as far away from the lock as possible and exert the greatest possible moment on the door.

The stop is preferably made of a material that makes no noise when it comes into contact with the vehicle body or the door. The stop can be made at least in part of a resilient material such as, for example, plastic, rubber, or a metal covered with rubber or with plastic.

Figure 2:
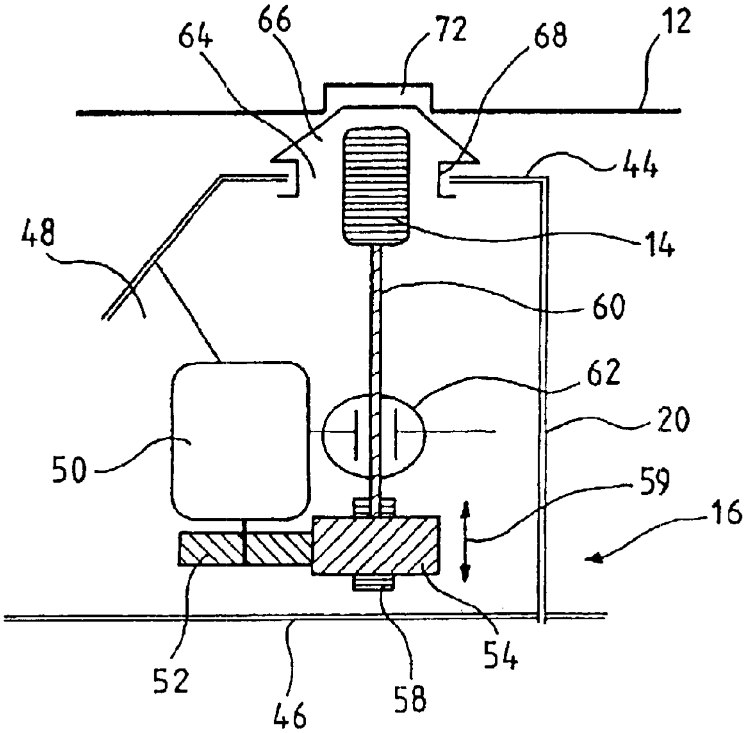
FIG. 2 is a view in section on A—A of the vehicle of FIG. 1.

FIG. 2 is a section view taken along line A—A of the vehicle of FIG. 1. The stop 14 is described in this example as being in the door 16. The stop 14 may also be in the vehicle body.

FIG. 2 shows the door 16 comprising the interior face 44 and an exterior face 46. The interior face 44 faces towards the interior of the vehicle. The interior 44 and exterior 46 faces define a caisson 48 in the door 16. The stop and its drive mechanism are held in the caisson.

One example of a drive mechanism for driving the stop will be given. The stop 14 is displaced by a drive member 50 such as a motor consuming a power of less than 50 W, for example. The force developed by the motor may be between 4 and 6 N. The drive member 50 displaces the stop 14 transversely to the interior face 44 so that the moment with respect to the lock is as large as possible. In the example of FIG. 2, the stop 14 is driven in translation via gearing 52, 54. The pinion 52 is driven by the member 50; the pinion 52 drives the rotation of the gearwheel 54. The gearing allows the motor power to be amplified. The gearwheel 54 has a recess in which a pin 58 is mounted so that it can slide in the direction of the double-headed arrow 59. The pin 58 is driven in rotation by the gearwheel 54. For that, the recess in the gearwheel 54 and the pin 58 have, for example, a square section. The stop 14 is connected to the pin 58 by a screw 60. A captive nut 62 allows the rotational movement of the pin 58 to be converted into a translational movement of the stop 14 transversely to the interior face 44 of the door 16. The screw 60 extends through the nut 62 collaboration between the rotating screw 60 and the nut 62 allows the pin 58, the screw 60 and the stop 14 to slide along the axis of rotation of the gearwheel 54. The screw thread 60 is preferable irreversible which means that the stop remains in position regardless of the axial forces to which it is subjected.

Alternatively, the member 50 may drive a worm itself driving the wheel 54. The axis of rotation of the member 50 is then at right angles to the worm (screw) 60. The axis of rotation of the member 50 may thus be arranged in the direction of travel of the vehicle, which is advantageous in the bottom of a door where space in a transverse direction is reduced.

The member 50 allows the stop 14 to be moved through an opening 64 in the interior face 44 towards a position projecting from the face 44. The member 50 allows the stop 14 to be moved from a retracted position inside the door 16 into a position urging against the vehicle body 12. In the position retracted inside the door 16, the stop 14 is embedded, allowing the door 16 to be opened and closed with ease. In the urging position, the stop 14 projects from the interior face 44 against the vehicle body 12 and maintains the distance between the lower part of the door and the vehicle body 12. The end of travel is determined, for example, by a timer fixing a time for which the member 50 is in operation.

As a preference, the stop 14 in the urging position enters a guide hole 72 (FIG. 2) formed in the vehicle body 12 or in the door 16, depending on which element contains the stop 14 in the retracted position. FIG. 2 shows this hole. The advantage is that the hole 72 prevents the stop 14 from skidding in the urging position.

Advantageously, the stop 14 comprises a bellows 66 plugging the opening 64. The bellows 66 allows the caisson 48 to be isolated against the ingress of moisture through the opening 64. The stop 14 urges the bellows 66 against the vehicle body. This is advantageous when the stop 14 is made of metal because it avoids metal-to-metal contact between the stop 14 and the vehicle body 12.

The bellows 66 may be elastically deformable. The bellows 66 deforms as the stop 14 is displaced projecting towards the urging position. The bellows 66 returns to its initial shape as the stop is displaced towards its retracted position.

Alternatively, the bellows 66 may be mounted so that it can move in terms of translation with respect to the interior face 44. Thus, the bellows 66 accompanies the movements of the stop 14. The stop 14 pushes the bellows 66 when the stop 14 is displaced towards its urging position. The bellows 66 may be fixed to the stop 14 in such a way as to move towards the inside of the caisson 48 at the same time as the stop 14 retracts. In one embodiment, the bellows 66 is not fixed to the stop 14, and is retracted by the action of the door 16 against the vehicle body 12. To allow the relative displacement of the bellows 66 with respect to the interior face 44, the bellows has a cross section of the same kind as the opening 64, for example, round. The bellows 66 has a groove 68 on its external periphery that the edge of the opening 64 enters. The groove 68 has a dimension transverse to the interior face 44 that is greater than the thickness of the interior face 44. Thus, the bellows 66 can move in terms of translation transversely to the interior face 44.

The invention also relates to the door as described in conjunction with FIG. 2.

The invention also relates to the retractable vehicle door stop 14 actuated for example by a vehicle speed or displacement sensor. The stop may also be activated by action of a door handle or of the locking and unlocking controls.

Of course, the present invention is not restricted to the embodiments described by way of example. Thus, the stop 14 is described in conjunction with FIG. 2 nonlimitingly on the door. The stop may be able to move through an opening made in the vehicle body.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A vehicle door stop system, comprising:

a stop; and an actuation mechanism that moves the stop between an urging position, in which the stop maintains a constant distance between a lower part of a door and a vehicle body when the door is closed, and a retracted position, in which the stop does not maintain a constant distance between the lower part of the door and the vehicle body when the door is closed.

2. The system according to claim 1, wherein the actuation mechanism comprises a sensor that senses at least one of a vehicle speed and a vehicle displacement and outputs a signal, wherein the stop is moved in response to the signal.

3. The system according to claim 2, wherein the sensor outputs the signal if at least one of the vehicle speed and the vehicle displacement is above a threshold value.

4. The system according to claim 1, wherein the actuating mechanism is operably coupled to a door handle, wherein manipulation of the door handle causes the stop to move to the retracted position.

5. The system according to claim 1, wherein the actuating mechanism moves the stop to the urging position in response to a security locking command from a theft prevention system.

6. The system according to claim 1, wherein the stop is movable transversely with respect to an interior face of the vehicle door.

7. The system according to claim 1, further comprising a drive mechanism for driving the stop.

8. The system according to claim 1, further comprising a bellows that is deformable by the stop when the stop moves toward the urging position.

9. The vehicle according to claim 1, wherein the stop is disposed in the vehicle body.

10. The vehicle according to claim 1, wherein the stop is disposed in the door.

11. A vehicle door, comprising:

an interior face and an exterior face;

a stop; and an actuation mechanism that moves the stop between an urging position, in which the stop maintains a constant distance between a lower part of the door and a body when the door is closed, and a retracted position, in which the stop does not maintain a constant distance between the lower part of the door and the vehicle body when the door is closed.

12. The system according to claim 11, wherein the stop is movable transversely with respect to the interior face of the vehicle door.

13. The vehicle door according to claim 11, wherein the door has a caisson defined between the interior face and the exterior face, wherein the stop retracts into the caisson in the retracted position and projects from the interior face in the urging position.

14. The vehicle door according to claim 13, wherein the actuation mechanism is disposed at least in part in the caisson.

15. The vehicle door according to claim 11, wherein the actuation mechanism comprises a sensor that senses at least one of a vehicle speed and a vehicle displacement and outputs a signal, wherein the stop is moved in response to the signal.

16. The vehicle door according to claim 15, wherein the sensor outputs the signal if at least one of the vehicle speed and the vehicle displacement is above a threshold value.

17. The vehicle door according to claim 11, further comprising a door handle operably coupled to the actuating mechanism, wherein manipulation of the door handle causes the stop to move to the retracted position.

18. The vehicle door according to claim 11, wherein the actuating mechanism moves the stop to the urging position in response to a security locking command from a theft prevention system.

19. The vehicle door according to claim 11, further comprising a drive mechanism for driving the stop.

20. The vehicle door according to claim 11, further comprising a bellows that is deformable by the stop when the stop moves toward the urging position, wherein the bellows plugs an opening in the interior face of the door.

* * * * *